United States Patent
Grella

(10) Patent No.: US 12,128,552 B2
(45) Date of Patent: Oct. 29, 2024

(54) COLLABORATIVE ROBOT LINE MANAGEMENT SYSTEM

(71) Applicant: Raytheon Company, Tewksbury, MA (US)

(72) Inventor: Joseph E. Grella, Shrewsbury, MA (US)

(73) Assignee: Raytheon Company, Tewksbury, MA (US)

( * ) Notice: Subject to any disclaimer, the term of this patent is extended or adjusted under 35 U.S.C. 154(b) by 126 days.

(21) Appl. No.: 16/903,291

(22) Filed: Jun. 16, 2020

(65) Prior Publication Data

US 2021/0387361 A1    Dec. 16, 2021

(51) Int. Cl.
  *B25J 19/00*      (2006.01)
  *F16M 13/02*      (2006.01)
  (Continued)

(52) U.S. Cl.
  CPC ....... *B25J 19/0025* (2013.01); *B25J 19/0029* (2013.01); *F16M 13/022* (2013.01);
  (Continued)

(58) Field of Classification Search
  CPC ... B25J 19/0025; B25J 19/0029; H02G 11/00; F16L 3/227
  (Continued)

(56) References Cited

U.S. PATENT DOCUMENTS 2,179,406 A * 11/1939 Fitzpatrick .............. F16L 3/221
                                                        174/149 R
2,543,997 A *  3/1951 Vavra ..................... F16L 3/221
                                                        248/68.1
(Continued)

FOREIGN PATENT DOCUMENTS

CN    1672853 A    9/2005
CN    1733436 A    2/2006
(Continued)

OTHER PUBLICATIONS

Definition of the term "Clamp", Merriam-Webster Dictionary, on-line version, 2024 (Year: 2024).*
(Continued)

*Primary Examiner* — William C Joyce
(74) *Attorney, Agent, or Firm* — Schwegman Lundberg & Woessner, P.A.

(57) ABSTRACT

A collaborative robot line management system comprises a first bracket and a second bracket. The collaborative robot line management system is operable to manage the positioning and routing of a plurality of flexible lines relative to a collaborative robot. The first bracket comprises a support portion having a plurality of apertures formed therein, and a collaborative robot mounting portion configured to interface with a first mount of a collaborative robot. The second bracket comprises a support portion having a plurality of apertures formed therein, and a collaborative robot mounting portion configured to interface with a second mount of a collaborative robot. The collaborative robot mounting portions of the first and second brackets facilitate mounting of the first and second brackets to the collaborative robot at first and second mounting locations, respectively.

17 Claims, 8 Drawing Sheets

(51) Int. Cl.
*B25J 19/06* (2006.01)
*F16L 3/22* (2006.01)
*H02G 11/00* (2006.01)

(52) U.S. Cl.
CPC ............ *B25J 19/00* (2013.01); *B25J 19/0075* (2013.01); *B25J 19/06* (2013.01); *F16L 3/22* (2013.01); *F16L 3/221* (2013.01); *H02G 11/00* (2013.01)

(58) Field of Classification Search
USPC ........................................................ 248/68.1
See application file for complete search history.

(56) References Cited

U.S. PATENT DOCUMENTS

| | | | | |
|---|---|---|---|---|
| 4,030,741 | A * | 6/1977 | Fidrych | H02G 3/0675 174/653 |
| 4,715,571 | A * | 12/1987 | Soltow | F16L 3/22 24/339 |
| 4,855,560 | A * | 8/1989 | Sonoda | B25J 19/0029 219/86.25 |
| 5,225,648 | A * | 7/1993 | Torii | B23K 26/0884 901/42 |
| 5,651,519 | A * | 7/1997 | Goodrich | F16L 3/1091 248/51 |
| 5,816,736 | A * | 10/1998 | Kroulik | B25J 19/0025 403/385 |
| 7,223,918 | B2 * | 5/2007 | Gelibert | H01R 4/5066 174/95 |
| 7,546,985 | B1 * | 6/2009 | Choi | F16L 3/01 248/62 |
| 7,703,349 | B2 | 4/2010 | Nihei et al. | |
| 7,810,764 | B2 | 10/2010 | Burlot | |
| 8,020,466 | B2 | 9/2011 | Inoue et al. | |
| 8,978,508 | B2 * | 3/2015 | Kume | B25J 19/0025 901/29 |
| 9,254,575 | B2 * | 2/2016 | Murakami | B25J 19/0025 |
| 9,975,239 | B2 * | 5/2018 | Kinoshita | B25J 9/0024 |
| 10,603,787 | B2 * | 3/2020 | Nakayama | H01R 39/64 |
| 2009/0146019 | A1 * | 6/2009 | Choi | F16L 3/01 248/62 |
| 2012/0255388 | A1 * | 10/2012 | McClosky | B25J 19/0025 74/490.02 |
| 2014/0103168 | A1 * | 4/2014 | Kume | B25J 19/0025 248/51 |
| 2016/0313525 | A1 * | 10/2016 | Fletcher | G02B 6/4453 |
| 2017/0059059 | A1 | 3/2017 | Carruthers | |
| 2019/0152071 | A1 * | 5/2019 | Deister | B25J 9/04 |
| 2020/0036173 | A1 * | 1/2020 | Chen | H01B 7/0045 |
| 2020/0108508 | A1 | 4/2020 | Hammar et al. | |
| 2021/0143619 | A1 * | 5/2021 | Fujioka | H02G 15/013 |

FOREIGN PATENT DOCUMENTS

| | | |
|---|---|---|
| CN | 101450485 A | 6/2009 |
| CN | 106737866 A | 5/2017 |
| CN | 209755271 U | 12/2019 |
| DE | 102015114300 A1 | 3/2016 |
| DE | 10 2006 034 303 * | 5/2017 |
| JP | 1-153290 * | 6/1989 |
| JP | 08-197482 * | 8/1996 |
| JP | 2003-266360 A | 9/2003 |
| JP | 2018037317 A | 3/2018 |
| JP | 2018-140456 * | 9/2018 |
| JP | 2019-010695 A | 1/2019 |
| KR | 2014-0003119 A | 1/2014 |
| TW | 201832865 A | 9/2018 |
| WO | WO 2018/001548 * | 1/2018 |

OTHER PUBLICATIONS

International Search Report for International Application No. PCT/US2021/027512 dated Jul. 16, 2021, 12 pages.
"Japanese Application Serial No. 2022-577277, Notification of Reasons for Refusal mailed Dec. 26, 2023", w English Translation, 10 pgs.
"Taiwanese Application Serial No. 110111414, Office Action mailed Feb. 7, 2024", w/o English Translation, 10 pgs.

* cited by examiner

90

92 — Secure a first bracket comprising a support surface having a plurality of apertures formed therein to a first mount of a collaborative robot.

94 — Secure a second bracket comprising a support surface having a plurality of apertures formed therein to a second mount of a collaborative robot.

96 — Route a first flexible line of a plurality of flexible lines along the collaborative robot through a first aperture of the plurality of apertures of the first bracket, and through a first aperture of the plurality of apertures of the second bracket.

98 — Route a second flexible line of a plurality of flexible lines along the collaborative robot through a second aperture of the plurality of apertures of the first bracket, and through a second aperture of the plurality of apertures of the second bracket.

FIG. 8

COLLABORATIVE ROBOT LINE MANAGEMENT SYSTEM

BACKGROUND

Industries frequently use robots during manufacturing and other operations. While robots can be a tremendous benefit, they can also pose a safety hazard. For this reason, many robots typically require their own safe enclosure where humans cannot enter while the robots are operating. Other robots can be designed to work alongside humans. Such robots are called collaborative robots and they typically have a lower payload compared to traditional robots. The lower payload allows the robot to halt if a collision with a human occurs. These collaborative robots can have sensitive force sensors at the base of the robot to sense when a collision has occurred and to halt further motion of the robot.

FIG. 1 illustrates an example of a common collaborative robot 10. A collaborative robot 10 typically requires tooling 12 to be attached to an end effector 14 of the collaborative robot 10. The tooling 12 can be in communication with external supply sources for operation of the collaborative robot 10 and for performing various tasks. Types of external supply sources can include, but are not limited to, electrical power sources, compressed air sources, fluid sources, and/or other external supply sources, as well as computer sources, where the collaborative robot 10 and/or the tooling 12 can be in communication with a computing device via one or more data transfer or other types of cables. External lines such as power cables, data cables, air or other fluid lines, hydraulic lines, fiber optic cables, and/or other types of lines can connect the tooling 12 to external supply sources and computing devices. The lines can be separate from the collaborative robot 10 and can run along links or jointed support members 16 of the collaborative robot 10 to the end effector 14. The lines can be encased and bundled together in a shroud or conduit 18 to protect the lines and prevent loose lines that may interfere with the operation of the robot. Additionally, the conduit 18 can be mounted to the collaborative robot 10 using mounting hardware 22 supported about the one or more links 16 to allow the conduit 18 to flex when the robot moves about the robot's joints 20. Thus, the conduit 18 prevents the lines from binding when the collaborative robot 10 moves. The tooling 12, the lines, the conduit 18, and the mounting hardware 22 can reduce the available payload of the collaborative robot 10.

BRIEF DESCRIPTION OF THE DRAWINGS

Features and advantages of the invention will be apparent from the detailed description which follows, taken in conjunction with the accompanying drawings, which together illustrate, by way of example, features of the invention; and, wherein.

FIG. 8 illustrates a block diagram of a method for securing a plurality of flexible lines for operating tooling mounted on an end effector of a collaborative robot.

Figure 1:
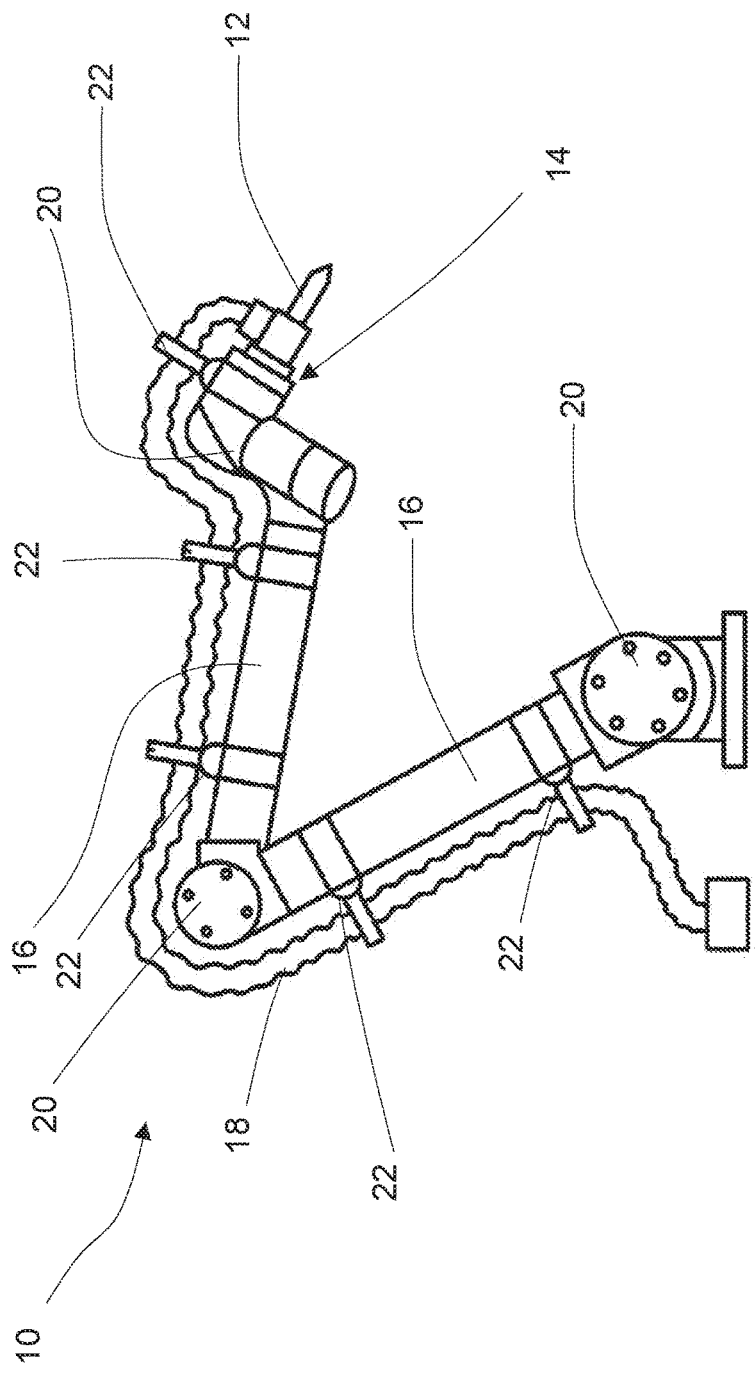
FIG. 1 illustrates an example prior art collaborative robot operating system.

Reference will now be made to the examples illustrated, and specific language will be used herein to describe the same. It will nevertheless be understood that no limitation of the scope of the invention is thereby intended.

DETAILED DESCRIPTION

An initial overview of the inventive concepts is provided below, and then specific examples are described in further detail later. This initial summary is intended to aid readers in understanding the examples more quickly but is not intended to identify key features or essential features of the examples, nor is it intended to limit the scope of the claimed subject matter.

In one example, disclosed is a collaborative robot operating system. The collaborative robot operating system comprises a collaborative robot, a plurality of flexible lines, and a collaborative robot line management system. The collaborative robot comprises at least one articulating arm and an end effector, a first mount located at a first location, and second mount located at a second location. The plurality of flexible lines is operable with the collaborative robot to facilitate a task associated with operation of the end effector of the collaborative robot. The collaborative robot line management system is operable to manage the positioning and routing of plurality of flexible lines relative to the collaborative robot. The collaborative robot line management system comprises a first bracket mounted to the first mount of the collaborative robot and a second bracket mounted to the second mount of the collaborative robot. The first bracket comprises a support portion having a plurality of apertures formed therein, and the second bracket comprises a support portion having a plurality of apertures formed therein. The first flexible line of the plurality of flexible lines is received through an aperture of, and supported by, at least one of the first and second brackets.

In accordance with a more detailed aspect, the first bracket can further comprise one or more line clamps supported by the support portion of the first bracket, and operable to apply a clamping force to a flexible line supported by the first bracket to secure the flexible line to the first bracket.

In accordance with a more detailed aspect, the one or more line clamps can comprise one or more line glands supported by the support portion of the first bracket, the one or more line glands each having a thru hole aligned with an aperture of the plurality of apertures formed in the support portion of the first bracket.

In accordance with a more detailed aspect, the second bracket can further comprise one or more line clamps supported by the support portion of the second bracket, and operable to apply a clamping force to a flexible line supported by the second bracket to secure the flexible line to the second bracket.

In accordance with a more detailed aspect, the one or more line clamps can comprise one or more line glands supported by the support portion of the second bracket, the one or more line glands each having a thru hole aligned with an aperture of the plurality of apertures formed in the support portion of the second bracket.

In accordance with a more detailed aspect, a second flexible line of the plurality of flexible lines can be received through an aperture of the first bracket and an aperture of the second bracket, such that the second flexible line is supported by each of the first and second brackets.

In accordance with a more detailed aspect, the collaborative robot line management system can further comprise a line tie extending around the plurality of flexible lines to restrain the flexible lines in group at a specific axial location along the length of the plurality of flexible lines.

Also disclosed is a collaborative robot line management system operable to manage the positioning and routing of a plurality of flexible lines relative to a collaborative robot. The collaborative robot line management system comprises a first bracket and a second bracket. The first bracket comprises a support portion having a plurality of apertures formed therein, and a collaborative robot mounting portion configured to interface with a first mount of a collaborative robot. The second bracket comprises a support portion having a plurality of apertures formed therein, and a collaborative robot mounting portion configured to interface with a second mount of a collaborative robot. The collaborative robot mounting portions of the first and second brackets facilitate mounting of the first and second brackets to the collaborative robot at first and second mounting locations, respectively.

In accordance with a more detailed aspect, the first bracket can further comprise one or more line clamps supported by the support portion of the first bracket, and operable to apply a clamping force to a flexible line supported by the first bracket to secure the flexible line to the first bracket.

In accordance with a more detailed aspect, the one or more line clamps can comprise one or more line glands supported by the support portion of the first bracket, the one or more line glands each having a thru hole aligned with an aperture of the plurality of apertures formed in the support portion of the first bracket.

In accordance with a more detailed aspect, the second bracket can further comprise one or more line clamps supported by the support portion of the second bracket, and operable to apply a clamping force to a flexible line supported by the second bracket to secure the flexible line to the second bracket.

In accordance with a more detailed aspect, the one or more line clamps can comprise one or more line glands supported by the support portion of the second bracket, the one or more line glands each having a thru hole aligned with an aperture of the plurality of apertures formed in the support portion of the second bracket.

In accordance with a more detailed aspect, the plurality of apertures of the first bracket can comprise a first group of apertures having a first diameter and a second group of apertures having a second diameter, and the first diameter can be larger than the second diameter.

In accordance with a more detailed aspect, the first bracket can have a collaborative robot mounting portion extending from (e.g., extending perpendicularly from or transverse to) the support portion.

In accordance with a more detailed aspect, the collaborative robot line management system can further comprise a line tie extending around the plurality of flexible lines to restrain the plurality of flexible lines in a group at a specific axial location along the length of the plurality of flexible lines.

Also disclosed is a method for securing a plurality of flexible lines for operating tooling mounted on an end effector of a collaborative robot. The method comprises securing a first bracket comprising a support portion having a plurality of apertures formed therein to a first mount of a collaborative robot, securing a second bracket comprising a support portion having a plurality of apertures formed therein to a second mount of a collaborative robot, routing a first flexible line of a plurality of flexible lines along the collaborative robot through a first aperture of the plurality of apertures of the first bracket, and through a first aperture of the plurality of apertures of the second bracket, and routing a second flexible line of a plurality of flexible lines along the collaborative robot through a second aperture of the plurality of apertures of the first bracket, and through a second aperture of the plurality of apertures of the second bracket.

In accordance with a more detailed aspect, the first bracket can comprise at least one clamp associated with an aperture of the plurality of apertures of the support portion of the first bracket, wherein the at least one clamp is operable to secure at least one of the first or second flexible lines to the first bracket, the method further comprising causing the one or more clamps of the first bracket to apply a compression force to secure at least one of the first or second flexible lines to the first bracket.

In accordance with a more detailed aspect, the second bracket can comprise at least one clamp associated with an aperture of the plurality of apertures of the support portion of the second bracket, wherein the at least one clamp is operable to secure at least one of the first or second flexible lines to the second bracket, the method further comprising causing the one or more clamps of the second bracket to apply a compression force to secure at least one of the first or second flexible lines to the second bracket In accordance with a more detailed aspect, each clamp of the first and second bracket can comprise a line gland having a thru hole aligned with a respective aperture of the plurality of apertures formed in the support portions of the respective first and second brackets.

In accordance with a more detailed aspect, the method can further comprise removing the first flexible line from the first aperture of the first bracket and the first aperture of the second bracket, and routing a third flexible line of a plurality of flexible lines along the collaborative robot through a first aperture of the plurality of apertures of the first bracket, and through a first aperture of the plurality of apertures of the second bracket.

In accordance with a more detailed aspect, the method can further comprise securing a tie around the plurality of flexible lines.

The present technology provides several benefits compared to the conventional technique of encasing flexible lines in a conduit, as shown in FIG. 1. A conduit must have a large diameter in order to bundle together and secure all of the flexible lines. The large diameter can result in the conduit being stiffer than one or more of the flexible lines individually. Additionally, bunching the lines together within the conduit can result in increased stiffness compared to the individual stiffness of the lines. Furthermore, the associated mounting hardware along with the weight of the conduit decreases the available payload of the end effector. In normal use, the limitation may not be appreciable, but when the collaborative robot is used with relatively heavy tooling with a weight approaching the available payload, or requiring multiple flexible lines, the increased stiffness and weight of the conduit, bundled lines, and associated mounting system may exceed the payload of the collaborative robot.

The present technology, in contrast, provides a lightweight solution for managing flexible lines that enables the collaborative robot to use tooling that could otherwise exceed the payload of the collaborative robot without the use of the present technology. Further, the present technology is advantageous in that it allows a single line to be replaced or interchanged without removing the entire line management system from the collaborative robot.

To further describe the present technology, examples are now provided with reference to the figures. With reference to FIGS. 2-7, the present disclosure sets forth a collaborative robot operating system 42 comprising a collaborative robot 30, a plurality of flexible lines 34, and a collaborative robot line management system 36. The collaborative robot 30 can comprise at least one articulating arm (the example of FIG. 2 comprises a first articulating arm 32a and a second articulating arm 32b connected by a joint 38) and an end effector 33 operably coupled to an articulating arm, such as first articulating arm 32a. Each articulating arm can have an end operably coupled to one of the end effector 33, another articulating arm, or a base 37. In the example shown, the first articulating arm 32a is operably coupled to the second articulating arm 32b by an elbow joint 38 at one end, and to the end effector 33 at the other end. In other examples, the articulating arms can be operably coupled by other joints such as spherical joints, rotating joints, and other robotic joints as known in the art. In addition, the collaborative robot 30 can comprise any number of articulating arms and associated joints. As such, the collaborative robot 30 shown and described herein is not intended to be limiting in any way.

The collaborative robot 30 can further comprise one or more mounts for mounting a collaborative robot line management system. In the example of shown, the mounts comprise a first mount 40a on the first articulating arm 32a at a first location and a second mount 40b on the base 37 at a second location. The mounts can comprise threaded holes for receiving a threaded fastener. In other examples, the mounts can be configured to facilitate the mounting of the first and second mounts 40a and 40b using other types of fasteners such as threaded studs.

The plurality of flexible lines 34 can be operable with the end effector 33 of the collaborative robot 30 to facilitate a task associated with operation of the end effector 33 and the collaborative robot 30. For example, the flexible lines 34 can comprise any type of flexible line, such as a compressed air line, an electrical line, a hydraulic or other fluid line, a vacuum line, a fiber optic line, or other line as known in the art, or any combination of these. The flexible lines can run alongside at least a portion of the collaborative robot 30 to the end effector 33. A first end of a flexible line can be operably coupled to the collaborative robot 30, to the end effector 33, or to tooling coupled to the end effector 33, and a second end of the flexible line can be operably coupled to a line supply source such as an electrical power source, a compressed air source, a fluid source, a computer source for a data connection, etc.

The collaborative robot line management system 36 is operable to manage the position and routing of the plurality of flexible lines 34 relative to the collaborative robot 30. For example, the collaborative robot line management system 36 can route the plurality of flexible lines 34 relative to the collaborative robot 30 such that the plurality of flexible lines 34 do not bind or interfere with the motion of the collaborative robot 30 during operation. Additionally, the collaborative robot line management system 36 can individually couple the plurality of flexible lines 34 in one of an infinite number of positions relative to the collaborative robot 30 so that they do not interfere with the collaborative robot 30 or the end effector (with or without tooling coupled) as these move through their respective available ranges of motion. Indeed, as will be described further below, each of the flexible lines 34 that are caused to be associated or utilized with the collaborative robot 30 for an intended purpose can be individually coupled at a coupling position along their length that allows each flexible line of the plurality of flexible lines 34 to be routed and coupled independent of any other flexible line of the plurality of flexible lines 34, thus maximizing a zone of operation of the collaborative robot 30 without interference from the flexible lines 34.

The collaborative robot line management system 36 can comprise a plurality of brackets that function to receive and couple the flexible lines 34 about or to the collaborative robot 30, such that they are individually supported about the collaborative robot 30 to facilitate one or more tasks to be completed by operation of the collaborative robot 30. In the example shown, the collaborative robot line management system 36 comprises a first bracket 44 and a second bracket 46. Other examples can have a greater number of brackets than the number of brackets shown. The first bracket 44 can be mounted to the first mount 40a of the collaborative robot 30 and the second bracket 46 can be mounted to the second mount 40b of the collaborative robot 30. Each bracket of the plurality of brackets can comprise a support portion having a plurality of apertures formed therein. A flexible line of the plurality of flexible lines 34 can be received through an aperture of, and be supported by, at least one of the brackets.

The first bracket 44 can comprise a collaborative robot mounting portion 48 and a support portion 50. The support portion 50 can extend from and can be formed on an incline relative to the collaborative robot mounting portion 48. In the example shown, the support portion 50 extends from and is formed perpendicular to the collaborative robot mounting portion 48, but this is not intended to be limiting in any way as the support portion 50 can be formed on any incline relative to the mounting interface 48. The support portion 50 can have a plurality of apertures 52 formed therein. The plurality of apertures 52 can have varying sizes. For example, a apertures 56 can have a diameter that is smaller than a diameter of a apertures 58. The varying diameter sizes can accommodate flexible lines of varying diameters. A flexible line positioned in one of the plurality of apertures 52 can be undersized relative to the diameter of the aperture, such that it may slide freely within the aperture. The plurality of apertures 52 can have a regular pattern. For example, the plurality of apertures 52 in the bracket 44 has a linear pattern with three rows of three apertures each. Other patterns of apertures are possible such as circular, linear, polygonal, etc. In still other examples, the apertures may be arranged without a regular pattern. Since large diameter flexible lines tend to be stiffer than smaller diameter flexible lines, apertures with larger diameters (e.g., apertures 58), as compared with apertures with smaller diameters (e.g., apertures 56), can be positioned closer to the collaborative robot mounting portion 48 to reduce any moment caused by the stiffness of a large diameter flexible line passing through the larger apertures 58.

The collaborative robot mounting portion 48 of the first bracket 44 can be configured to interface with (e.g., engage and seat onto) the first mount 40a. For example, the collaborative robot mounting portion 48 can have coupling features for facilitating mounting of the collaborative robot mounting portion 48 to the first mount 40a. In the example shown, the collaborative robot mounting portion 48 of FIG.

4 has two apertures 60 for securing the collaborative robot mounting portion 48 to a mount, such as first mount 40a. The two apertures 60 can align with two respective threaded sockets of the mount 40a and threaded fasteners (see FIG. 3) can pass through the apertures 60 and into the threaded sockets to secure the collaborative robot mounting portion 48, and thus the first bracket 44, to the collaborative robot 30. In other examples, a threaded post may pass through an aperture and a nut may be used to secure the collaborative robot mounting portion 48 to the mount 40a. Other mounting features and configurations can be utilized for mounting the collaborative robot mounting portion 48 to the mount 40a, such as welding, adhesives, and others as will be recognized by those skilled in the art.

The collaborative robot line management system 36 can further comprise one or more line clamps supported by the support portion 50 of the first bracket 44. The one or more line clamps can be associated with a respective aperture of the plurality of apertures 52 in the support portion 50. The one or more line clamps can be operable to apply a clamping force to a respective flexible line operable therewith and supported by the first bracket 44 to secure the flexible line to the first bracket 44 in one of an infinite number of positions along the length of the flexible line, and to lock an axial position of the flexible line relative to the first bracket 44. For example, the one or more clamps could be a clamping block, a "CL" clamp, or other line clamp as known in the art. In the example shown (see FIG. 5), the one or more line clamps comprise a type of clamp known as line glands 62. The line glands 62 can be conventional line glands that each have a thru hole 64 that can be compressed to retain a flexible line. The thru hole 64 can align with a respective aperture of the plurality of apertures 52 formed in the support portion 50. In some examples, the plurality of apertures 52 can have a mixed configuration with some of the apertures having line glands 62 and some of the apertures having one or more different types of clamps, or devoid of clamps altogether (with the line(s) being supported only by the respective apertures). The line glands 62 can be operable to selectively compress an outer surface of a flexible line to secure it in position relative to the first bracket 44, and to selectively release any applied compression force on the flexible line to allow the flexible line to move or slide axially relative to the aperture and the first bracket 44, such as to adjust an axial position of the flexible line. When the line gland 62 secures the position of the flexible line, the flexible line is unable to move laterally or axially relative to the first bracket 44. In contrast, an aperture without a line gland 62 is able to restrict lateral movement of the flexible line, but allows for the flexible line to move axially (i.e., slide within the aperture). If the flexible line secured by a line gland 62 requires axial movement, such as when replacing or repositioning a flexible line, the line gland 62 can be loosened to free the axial movement of the flexible line, the flexible line position adjusted, and the line gland 62 again caused to apply a compression force against the flexible line to secure it in the adjusted position.

As mentioned above, the collaborative robot line management system 36 can comprise a second bracket 46. The second bracket 46 can comprise a collaborative robot mounting portion 65 and a support portion 66. The support portion 66 can extend from the collaborative robot mounting portion 65. The support portion 66 can have a plurality of apertures 68 formed therein. The plurality of apertures 68 can have varying sizes. For example, apertures 70 can have a diameter that is smaller than a diameter of a apertures 72. The varying diameter sizes can accommodate flexible lines of varying diameters. A flexible line positioned in one of the plurality of apertures 68 can be undersized relative to the diameter of the aperture, such that it may slide freely within the aperture. The plurality of apertures 68 can have a regular or an irregular pattern. For example, the plurality of apertures 68 can be formed into the support portion 66 as shown. The support portion 66 can comprise multiple sections or segments. For example, as shown, the support portion 66 can comprise three sections. A first section 74 can comprise a first row of small apertures 70, a second section 76 can comprise a second row of small apertures 70, and a third section 78 can comprise an irregular arrangement of large apertures 72. In this example, the large apertures 72 are positioned proximate the center of the support portion 66.

The collaborative robot mounting portion 65 of the second bracket 46 can be configured to interface with the second mount 40b. For example, the collaborative robot mounting portion 65 can have coupling features for facilitating mounting of the collaborative robot mounting portion 65 to the second mount 40b. In the example shown, the collaborative robot mounting portion 65 has two apertures 80 for securing the collaborative robot mounting portion 65 to a mount, such as the second mount 40b. The two apertures 80 can align with two respective threaded sockets of the second mount 40b and threaded fasteners (see FIG. 3) can pass through the apertures 80 and into the threaded sockets to secure the collaborative robot mounting portion 65, and thus the second bracket 46, to the collaborative robot 30. In other examples, a threaded post may pass through an aperture and a nut may be used to secure the collaborative robot mounting portion 65 to the mount 40b. Other mounting features and configurations can be utilized for mounting the collaborative robot mounting portion 65 to the mount 40b, such as weldments and adhesives, and others as will be recognized by those skilled in the art.

The collaborative robot line management system 36 can further comprise one or more line clamps supported by the support portion 66 of the second bracket 46. The one or more line clamps can be associated with a respective aperture of the plurality of apertures 68 in the support portion 66. The one or more line clamps can be operable to apply a clamping force to a respective flexible line operable therewith and supported by the second bracket 46 to secure the flexible line to the second bracket 46 in one of an infinite number of positions along the length of the flexible line, and to lock an axial position of the flexible line relative to the first bracket 46. For example, the one or more clamps could be a clamping block, a "CL" clamp, or other line clamp as known in the art. In the example shown (see FIG. 7), the one or more line clamps comprise one or more line glands 62. The thru hole 64 of the line glands 62 can align with an aperture of the plurality of apertures 68 formed in the support portion 66. In some examples, the plurality of apertures 68 can have a mixed configuration with some of the apertures being operable with line glands 62 and some of the apertures being operable with one or more different types of clamps, or devoid of clamps altogether (with the line(s) being supported only by the respective apertures). The line glands 62 can be operable to selectively compress an outer surface of a flexible line to secure it in position relative to the second bracket 46, and to selectively release any applied compression force on the flexible line to allow the flexible line to move or slide axially relative to the aperture and the first bracket 44, such as to adjust an axial position of the flexible line. When the line gland 62 secures the position of the flexible line, the flexible line is unable to move laterally or axially relative to the second bracket 46. In contrast, an aperture without a line gland 62 is able to restrict lateral movement of the flexible line, but allows for the flexible line to move axially (i.e., slide within the aperture). If the flexible line secured by a line gland 62 requires axial movement, such as when replacing or repositioning a flexible line, the line gland 62 can be loosened to free the axial movement of the flexible line, the flexible line position adjusted, and the line gland 62 again caused to apply a compression force against the flexible line to secure it in the adjusted position.

It is noted that the first and second brackets 44 and 46 can be configured as needed or desired, and that the particular configuration of the first and second brackets 44 and 46 discussed above, and shown in the drawings, is not intended to be limiting in any way.

In some examples, the collaborative robot line management system 36 can further comprise a line tie 35 operable to restrain or bundle at least some of the plurality of flexible lines 34 in a group at a specific and designated axial location along the length of the flexible lines 34. The line tie 35 can extend around two or more of the plurality of flexible lines 34 to restrain the plurality of flexible lines 34. The line tie 35 can be a conventional line tie as known in the art. Other types of systems or devices can be used to bundle one or more of the plurality of lines 34 together.

Figure 2:
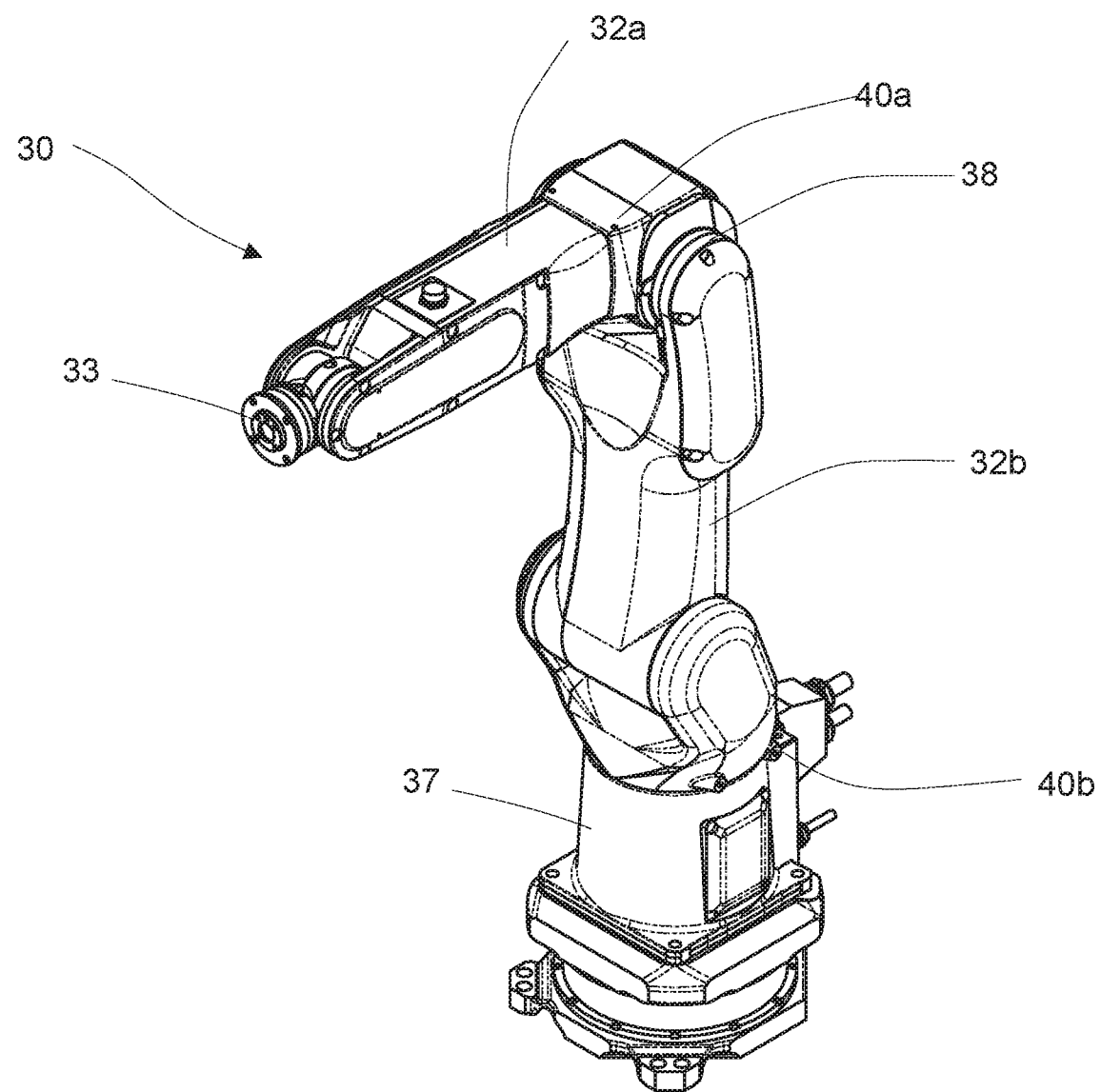
FIG. 2 illustrates a perspective view of a collaborative robot operating system having a collaborative robot line management system in accordance with an example of the present disclosure.
Figure 3:
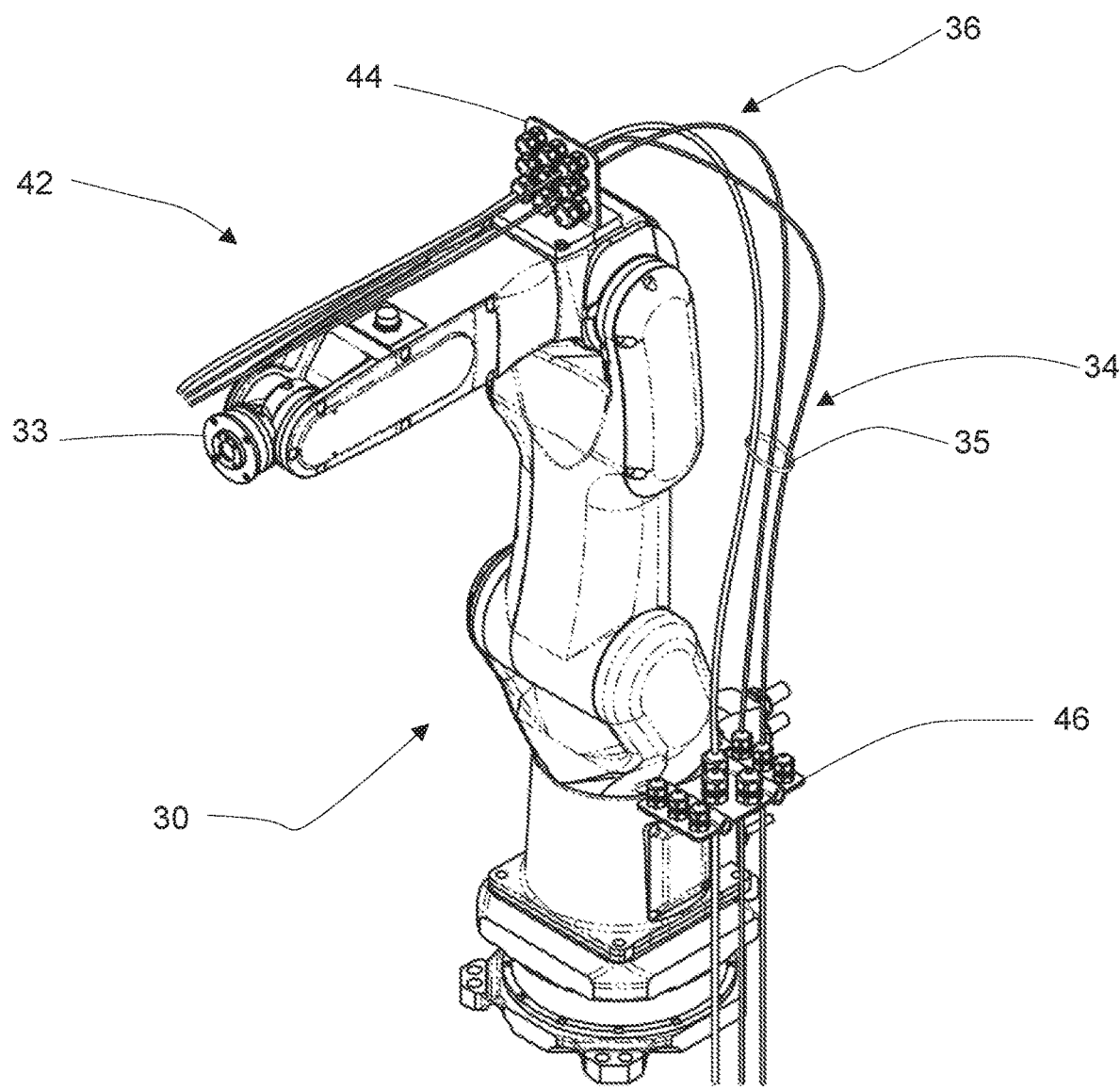
FIG. 3 illustrates a perspective view of the collaborative robot operating system of FIG. 2.
Figure 4:
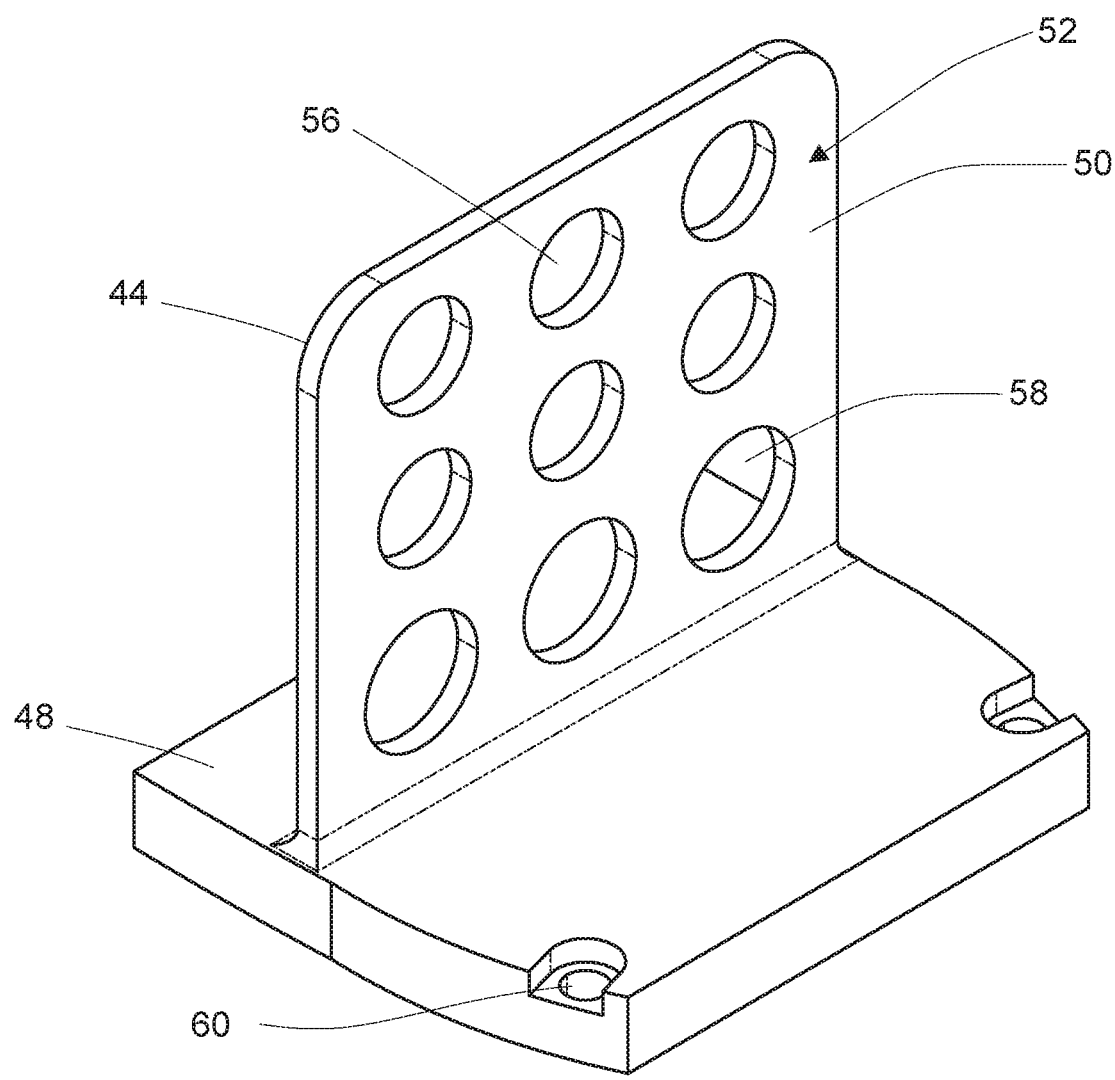
FIG. 4 illustrates a perspective view of a bracket of the line management system of the collaborative robot operating system of FIG. 3.
Figure 5:
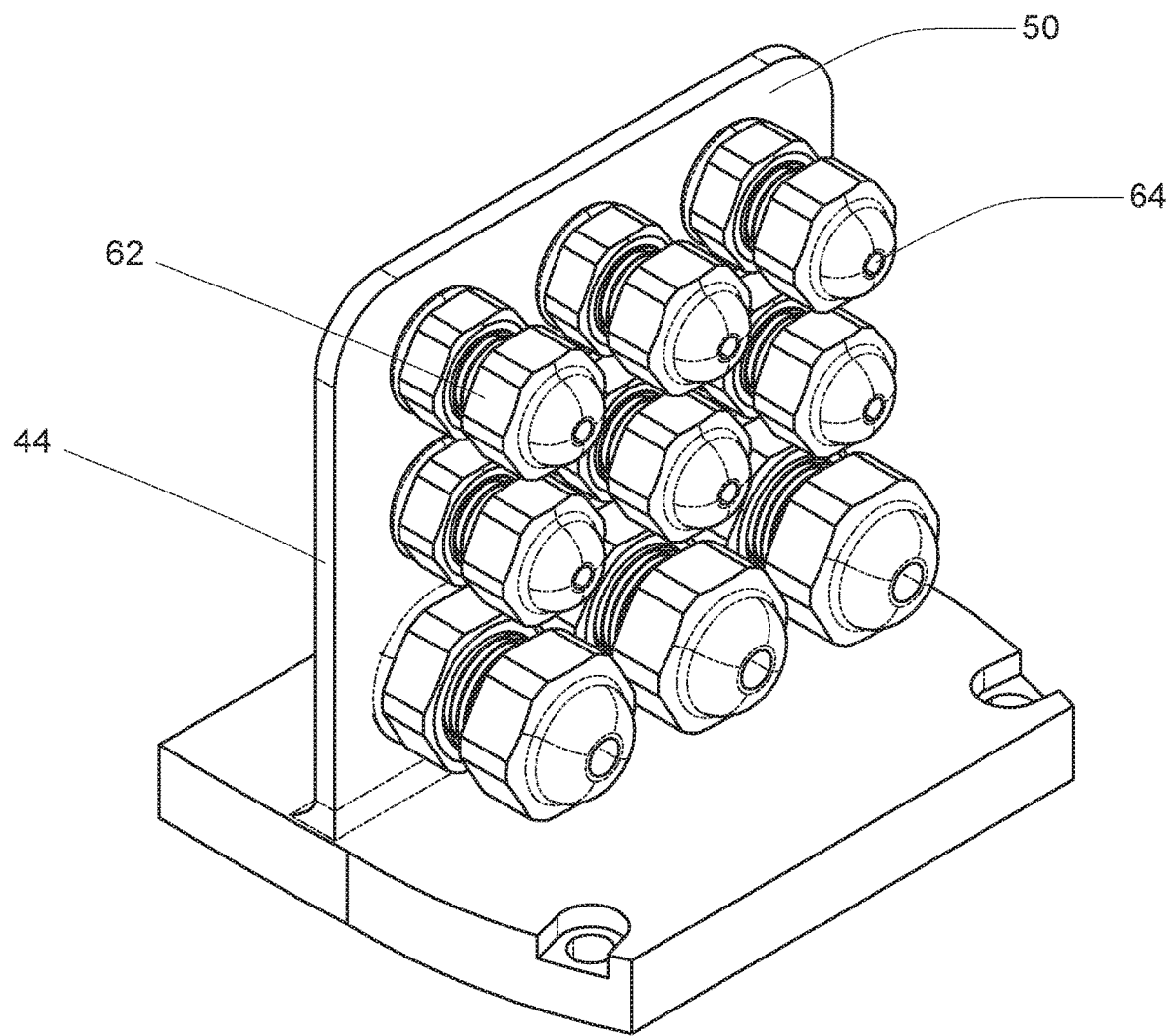
FIG. 5 illustrates a perspective view of the bracket of FIG. 4 utilizing cable glands.
Figure 6:
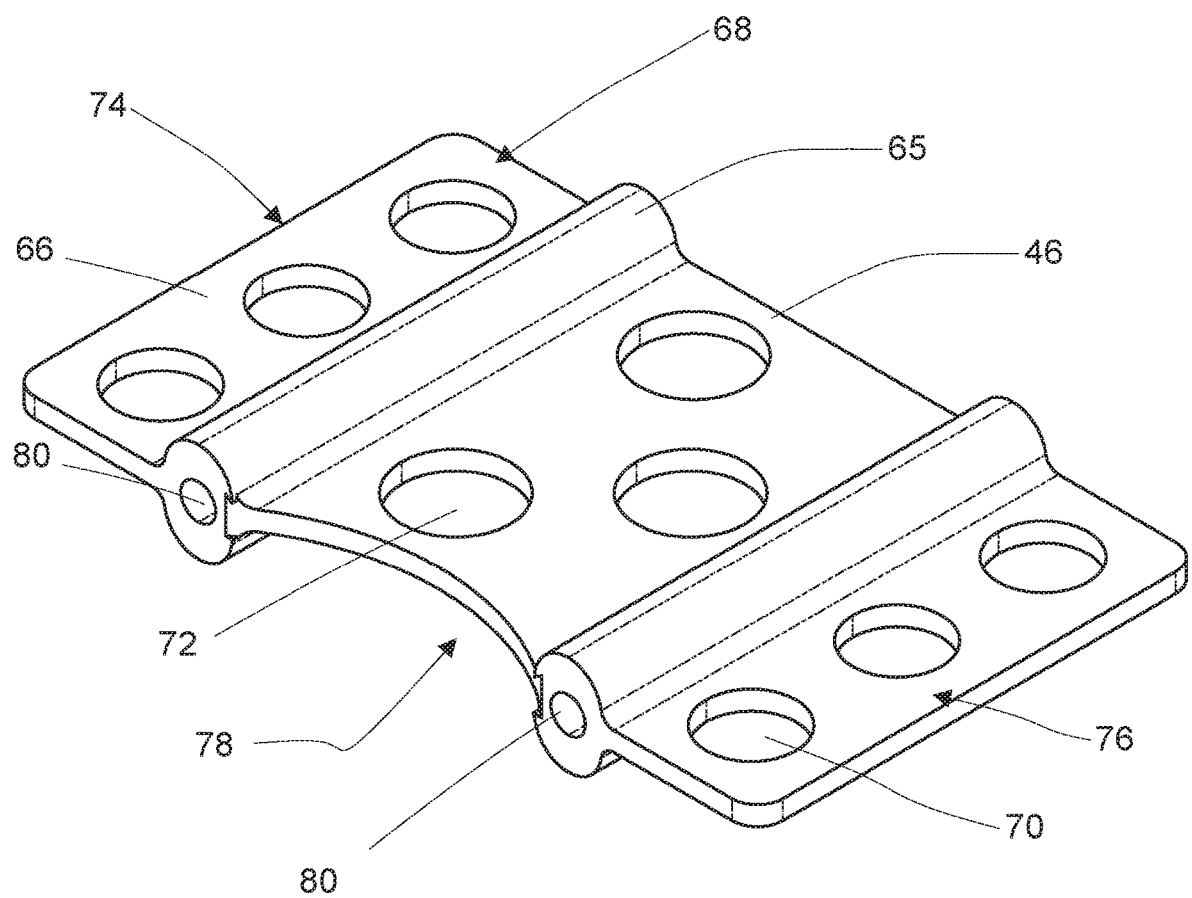
FIG. 6 illustrates a perspective view of another example of a bracket of the line management system of the collaborative robot operating system of FIG. 5.
Figure 7:
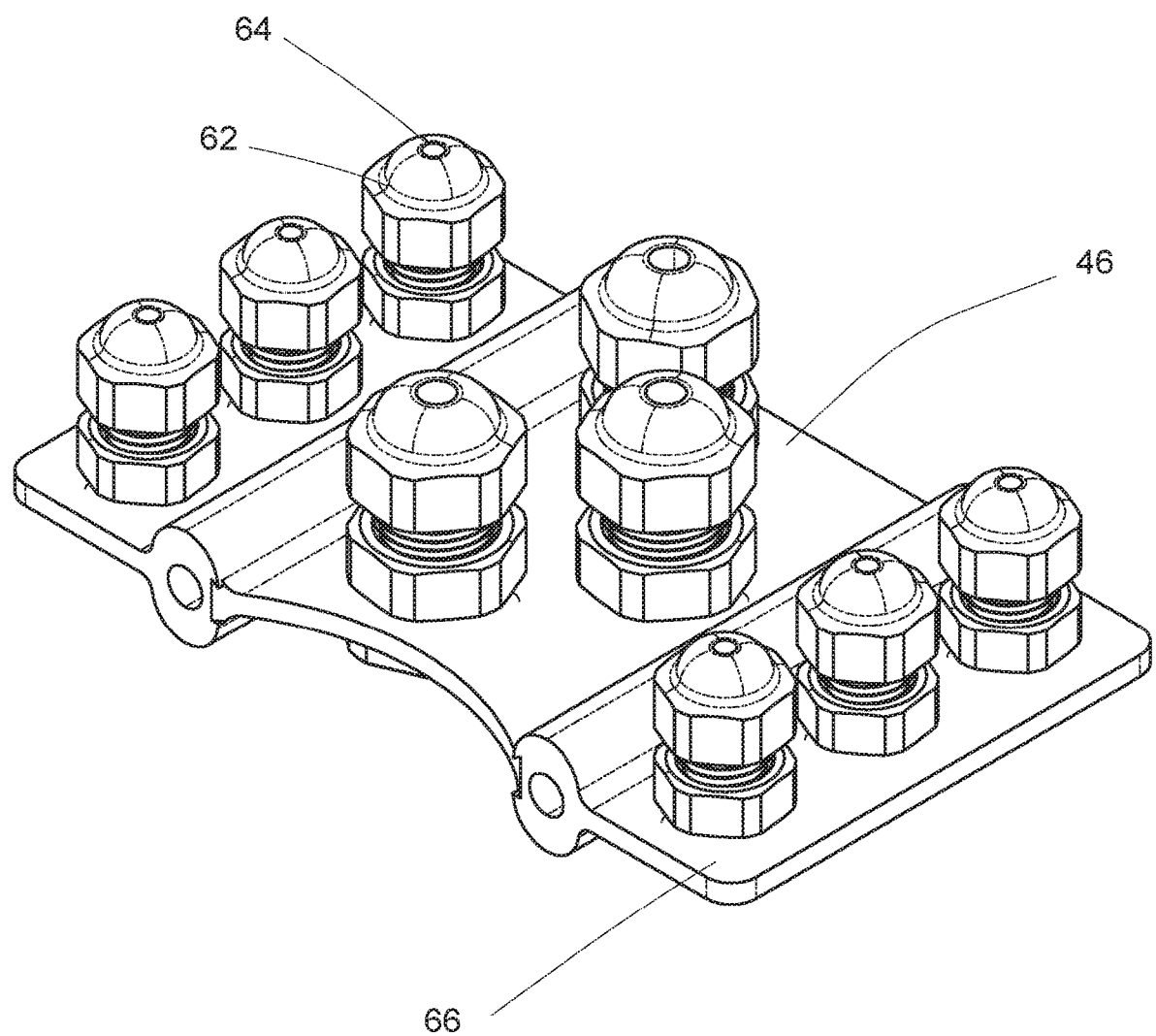
FIG. 7 illustrates a perspective view of the bracket of FIG. 6 utilizing cable glands.

FIG. 8 illustrates a method 90 for securing a plurality of flexible lines for operating tooling mounted on, or coupled to, or otherwise associated with an end effector of a collaborative robot, such as collaborative robot 30 of FIG. 2. The method includes an act 92 of securing a first bracket comprising a support portion having a plurality of apertures formed therein to a first mount of a collaborative robot. For example, referring to FIGS. 2-7, an operator could secure the first bracket 44 to the first mount 40a of the collaborative robot 30. The method further includes an act 94 of securing a second bracket comprising a support portion having a plurality of apertures formed therein to a second mount of a collaborative robot. For example, referring to FIGS. 2-7, an operator could secure the second bracket 46 to the second mount 40b of the collaborative robot 30. The method further includes an act 96 of routing a first flexible line of a plurality of flexible lines along the collaborative robot through a first aperture of the plurality of apertures of the first bracket, and through a first aperture of the plurality of apertures of the second bracket. Referring to FIGS. 2-7, an operator could route a first flexible line alongside the collaborative robot 30 passing the flexible line through a first aperture of the plurality of apertures 52 of the first bracket 44 and through a second aperture of the plurality of apertures 60 of the second bracket 46. The method further includes an act 98 of routing a second flexible line of a plurality of flexible lines along the collaborative robot through a second aperture of the plurality of apertures of the first bracket, and through a second aperture of the plurality of apertures of the second bracket. Referring to FIGS. 2-7, an operator could route a second flexible line alongside the collaborative robot 30 passing the second flexible line through a second aperture of the plurality of apertures 52 of the first bracket 44 and through a second aperture of the plurality of apertures 60 of the second bracket 46. In some examples, the method can further comprise the act of securing the one or more flexible lines to at least one of the first or second brackets and locking an axial movement of the one or more flexible lines routed through the respective apertures of at least one of the first or second brackets, such as by clamping the one or more flexible lines using a clamp (e.g., a line gland type of clamp) associated with a respective aperture of the plurality of apertures of the support portions of the first or second brackets. These acts can be repeated as often as necessary to couple, and optionally secure in place, any number of flexible lines to the collaborative robot using the collaborative robot line management system as discussed herein.

The described present technology of the collaborative robot line management system provides many advantages over prior line management systems. One advantage is that the collaborative robot line management system of the present technology facilitates the collection of flexible lines in operation with the collaborative robot to have a lower overall and collective stiffness and weight as compared to flexible lines bundled together in a conduit with its associated hardware. The lower stiffness allows a user to operate a collaborative robot using tooling that nears the available payload of the collaborative robot, thus expanding the available task capabilities of the collaborative robot. Moreover, the collaborative robot line management system of the present technology allows the flexible lines to move independent of one another (i.e., each flexible line is caused to substantially move in free space without interference from another flexible line) in response to the movements of the collaborative robot while still being secured to the collaborative robot in an organized manner. With such independent movement of the flexible lines, interaction forces from the flexible lines acting on each other in response to movements of the collaborative robot are significantly reduced or eliminated, particularly proximate the collaborative robot, as compared with flexible lines that are bundled together and supported in a conduit or sheath. It is recognized that some single point to point contact between flexible lines supported by the collaborative robot line management system may occur depending upon line routing paths and different movements of the collaborative robot, but the effects of these to cause negative interaction forces that affect the payload capacity of the collaborative robot will be negligible, as single point to point contacts with another flexible line produces less interaction forces than multiple contact points along an axis that typically occur between adjacent flexible lines bundled together and contained within a conduit or sheath. Still another advantage of the collaborative robot line management system of the present technology is that any of the flexible lines can be individually adjusted with respect to, or even disconnected and removed, from the brackets and/or the collaborative robot independent of and without disrupting, removing or disconnecting the remaining flexible lines.

It is to be understood that the examples set forth herein are not limited to the particular structures, process steps, or materials disclosed, but are extended to equivalents thereof as would be recognized by those ordinarily skilled in the relevant arts. It should also be understood that terminology employed herein is used for the purpose of describing particular examples only and is not intended to be limiting.

Furthermore, the described features, structures, or characteristics may be combined in any suitable manner in one or more examples. In the description, numerous specific details are provided, such as examples of lengths, widths, shapes, etc., to provide a thorough understanding of the technology being described. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Although the disclosure may not expressly disclose that some embodiments or features described herein may be combined with other embodiments or features described herein, this disclosure should be read to describe any such combinations that would be practicable by one of ordinary skill in the art. The use of "or" in this disclosure should be understood to mean non-exclusive or, i.e., "and/or," unless otherwise indicated herein.

While the foregoing examples are illustrative of the principles of the invention in one or more particular applications, it will be apparent to those of ordinary skill in the art that numerous modifications in form, usage and details of implementation can be made without the exercise of inventive faculty, and without departing from the principles and concepts described herein. Accordingly, it is not intended that the invention be limited, except as by the claims set forth below.

What is claimed is:

1. A collaborative robot operating system comprising:
    a collaborative robot comprising a first articulating arm and a second articulating arm connected by a joint and an end effector, the collaborative robot further comprising a first mount located relative to the joint on a same side as the first articulating arm and a second mount located relative to the joint on a same side as the second articulating arm;
    a plurality of externally exposed flexible lines operable with the collaborative robot to facilitate a task associated with operation of the end effector of the collaborative robot; and
    a collaborative robot line management system operable to manage the positioning and routing of any one flexible line of the plurality of flexible lines relative to the collaborative robot and independent of any other flexible line of the plurality of lines without disrupting, removing or disconnecting the remaining flexible lines of the plurality of flexible lines, the collaborative robot line management system comprising:
        a first bracket mounted to the first mount of the collaborative robot, the first bracket comprising a support portion having a plurality of apertures integrally formed therein;
        a second bracket mounted to the second mount of the collaborative robot on, the second bracket comprising a support portion having a plurality of apertures integrally formed therein;
        a first line clamp supported by the support portion of the first bracket, said first line clamp comprising a first line gland having a thru hole aligned with a first aperture of the plurality of apertures of the first bracket,
        a second line clamp supported by the support portion of the second bracket, said second line clamp comprising a second line gland having a thru hole aligned with a first aperture of the plurality of apertures of the second bracket,
    wherein a first flexible line of the plurality of flexible lines is received and extends through the first aperture of the plurality of apertures of the first bracket and the first aperture of the plurality of apertures of the second bracket, and clamped by the first and second line glands to engage an outer surface of the first flexible line to hold the first flexible line from moving axially and to lock an axial position of the first flexible line relative to the first and second brackets on opposite sides of the joint,
    wherein a second flexible line of the plurality of flexible lines is received through a second aperture of, and supported by, at least one of the first and second brackets,
    wherein the first and second flexible lines are individually coupled and moveable independent of one another in free space relative to the first and second brackets and without interference from one another, such that movement of the collaborative robot results in negligible interaction forces from the plurality of flexible lines upon acting on one another.

2. The collaborative robot operating system of claim 1, further comprising:
    third and fourth line clamps supported by the support portion of the first and second brackets, respectively, said third and fourth line clamps comprising third and fourth line glands having thru holes aligned with a third aperture in the plurality of apertures of the first and second brackets, respectively,
    wherein a third flexible line of the plurality of flexible lines received and extends through the third aperture of the plurality of apertures of the first and second brackets,
    wherein the third and fourth line glands engage an outer surface of the third flexible line to hold the third flexible line from moving axially and to lock an axial position of the third flexible line relative to the first and second brackets on opposite sides of the joint.

3. The collaborative robot operating system of claim 2, wherein the third flexible line is individually supported and adjustable relative to the first flexible line via the respective line clamps.

4. The collaborative robot operating system of claim 1, wherein the second flexible line is received through the second aperture of the first bracket and the second aperture of the second bracket, such that the second flexible line is supported by each of the first and second brackets.

5. The collaborative robot operating system of claim 1, wherein the collaborative robot line management system further comprises a line tie extending around the plurality of flexible lines to restrain the flexible lines in a group at a specific axial location along the length of the plurality of flexible lines.

6. A collaborative robot line management system operable to manage the positioning and routing of a plurality of flexible lines relative to a collaborative robot that comprises a first articulating arm and a second articulating arm connected by a joint, the collaborative robot line management system comprising:
    a first bracket comprising a support portion having a plurality of apertures integrally formed therein, and a collaborative robot mounting portion configured to interface with a first mount of a collaborative robot, the first mount being located relative to the joint on a same side as the first articulating arm;
    a second bracket comprising a support portion having a plurality of apertures integrally formed therein, and a collaborative robot mounting portion configured to interface with a second mount of a collaborative robot, the second mount being located relative to the joint on a same side as the second articulating arm;
    a first line clamp supported by the support portion of the first bracket, said first line clamp comprising a first line gland having a thru hole aligned with a first aperture of the plurality of apertures of the first bracket,
    a second line clamp supported by the support portion of the second bracket, said second line clamp comprising a second line gland having a thru hole aligned with a first aperture of the plurality of apertures of the second bracket, wherein the collaborative robot mounting portions of the first and second brackets facilitate mounting of the first and second brackets to the collaborative robot at first and second mounting locations, respectively;

wherein a first flexible line of the plurality of flexible lines is received through a second aperture of, and supported by, the first and second brackets, wherein the first and second line clamps are configured to receive a second flexible line such that the first and second flexible lines are externally exposed and individually coupled and moveable independent of one another in free space relative to the first and second brackets and without interference from one another, such that movement of the collaborative robot results in negligible interaction forces from the first and second flexible lines upon acting on one another, wherein the first and second line glands are operable to engage an outer surface of the second flexible line to hold the second flexible line from moving axially and to lock an axial position of the second flexible line relative to the first and second brackets on opposite sides of the joint, wherein the collaborative robot line management system facilitates management of any one of the first or second flexible lines independent of the other of the first or second flexible lines without disrupting, removing or disconnecting the other of the first or second flexible lines.

7. The collaborative robot line management system of claim 6, further comprising:

third and fourth line clamps supported by the support portion of the first and second brackets, respectively, said third and fourth line clamps comprising third and fourth line glands having thru holes aligned with a third aperture in the plurality of apertures of the first and second brackets, respectively, wherein a third flexible line of the plurality of flexible lines is received and extends through the third aperture of the plurality of apertures of the first and second brackets, wherein the third and fourth line glands engage an outer surface of the third flexible line to hold the third flexible line from moving axially and to lock an axial position of the third flexible line relative to the first and second brackets on opposite sides of the joint.

8. The collaborative robot line management system of claim 6, wherein the plurality of apertures of the first bracket comprises a first group of apertures having a first diameter and a second group of apertures having a second diameter, and wherein the first diameter is larger than the second diameter.

9. The collaborative robot line management system of claim 6, wherein the first bracket comprises a collaborative robot mounting portion extending from the support portion.

10. The collaborative robot line management system of claim 6, further comprising a line tie operable to extend around the plurality of flexible lines to restrain the plurality of flexible lines in a group at a specific axial location along the length of the plurality of flexible lines.

11. A method for securing a plurality of flexible lines for operating tooling mounted on an end effector of a collaborative robot that comprises a first articulating arm and a second articulating arm connected by a joint, comprising:

securing a first bracket comprising a support portion having a plurality of apertures integrally formed therein to a first mount of a collaborative robot, the first mount being located relative to the joint on a same side as the first articulating arm;

securing a second bracket comprising a support portion having a plurality of apertures integrally formed therein to a second mount of a collaborative robot, the second mount being located relative to the joint on a same side as the second articulating arm;

supporting, by the support portion of the first bracket, a first line clamp, said first line clamp comprising a first line gland having a thru hole aligned with a first aperture of the plurality of apertures of the first bracket;

supporting, by the support portion of the second bracket, a second line clamp, said second line clamp comprising a second line gland having a thru hole aligned with a first aperture of the plurality of apertures of the second bracket;

routing a first flexible line of a plurality of flexible lines along the collaborative robot through the first aperture of the plurality of apertures of the first bracket, and through the first aperture of the plurality of apertures of the second bracket; and routing a second flexible line of a plurality of flexible lines along the collaborative robot through a second aperture of the plurality of apertures of the first bracket, and through a second aperture of the plurality of apertures of the second bracket, wherein the first and second flexible lines are externally exposed;

clamping the first flexible line by the first and second line glands to engage an outer surface of the first flexible line to hold the first flexible line from moving axially and to lock an axial position of the first flexible line relative to the first and second brackets on opposite sides of the joint, wherein the first and second brackets facilitate management of any one of the first or second lines independent of the other of the first or second flexible lines without disrupting, removing or disconnecting the other of the first or second flexible lines, and wherein the first and second flexible lines are individually coupled and moveable independent of one another in free space relative to the first and second brackets and without interference from one another, such that movement of the collaborative robot results in negligible interaction forces from the plurality of flexible lines upon acting on one another.

12. The method of claim 11, further comprising:

supporting, by the support portion of the first bracket, a third line clamp comprising a third line gland having thru holes aligned with a third aperture in the plurality of apertures of the first bracket;

supporting, by the support portion of the second bracket, a fourth line clamp comprising a fourth line gland having thru holes aligned with a third aperture in the plurality of apertures of the second bracket;

routing a third flexible line of the plurality of flexible lines along the collaborative robot through the third aperture of the plurality of apertures of the first bracket, and through the third aperture of the plurality of apertures of the second bracket;

clamping the third flexible line by the third and fourth line glands to engage an outer surface of the third flexible line to hold the third flexible line from moving axially and to lock an axial position of the third flexible line relative to the first and second brackets on opposite sides of the joint.

13. The method of claim 11, further comprising:
removing the first flexible line from the first aperture of the first bracket and the first aperture of the second bracket; and
routing a third flexible line of the plurality of flexible lines along the collaborative robot through an aperture of the plurality of apertures of the first bracket, and through an aperture of the plurality of apertures of the second bracket.

14. The method of claim 11, further comprising securing a line tie around the plurality of flexible lines.

15. A collaborative robot operating system comprising:
a collaborative robot comprising a first articulating arm and a second articulating arm connected by a joint and an end effector, the collaborative robot further comprising a first mount located relative to the joint on a same side as the first articulating arm and a second mount located relative to the joint on a same side as the second articulating arm;
a plurality of externally exposed flexible lines operable with the collaborative robot to facilitate a task associated with operation of the end effector of the collaborative robot; and
a collaborative robot line management system operable to manage the positioning and routing of any one flexible line of the plurality of flexible lines relative to the collaborative robot and independent of any other flexible line of the plurality of lines without disrupting, removing or disconnecting the remaining flexible lines of the plurality of flexible lines, the collaborative robot line management system comprising:
a first bracket mounted to the first mount of the collaborative robot, the first bracket comprising a support portion having a plurality of apertures integrally formed therein;
a second bracket mounted to the second mount of the collaborative robot, the second bracket comprising a support portion having a plurality of apertures integrally formed therein;
a plurality of line clamps supported by the support portion of the first bracket, each of the line clamps being associated with a respective one of the plurality of apertures of the first bracket, each line clamp comprising a line gland having a thru hole aligned with the associated aperture;
a plurality of line clamps supported by the support portion of the second bracket, each of the line clamps being associated with a respective one of the plurality of apertures of the second bracket, each line clamp comprising a line gland having a thru hole aligned with the associated aperture,
wherein a first flexible line of the plurality of flexible lines is received and extends through a first aperture of the plurality of apertures of the first bracket and a first aperture of the plurality of apertures of the second bracket and held away from the first and second articulating arms, and clamped by a first line clamp of the plurality of line clamps of the first bracket and a first line clamp of the plurality of line clamps of the second bracket such that the first flexible line is fixed at the first and second brackets on opposite sides of the joint, wherein the line glands are configured to engage an outer surface of the first flexible line to hold the first flexible line from moving axially and to lock an axial position of the first flexible line relative to the first and second brackets on opposite sides of the joint,
wherein a second flexible line of the plurality of flexible lines is received and extends through a second aperture of the plurality of apertures of the first bracket and a second aperture of the plurality of apertures of the second bracket and held away from the first and second articulating arms, and clamped by a second line clamp of the plurality of line clamps of the first bracket and a second line clamp of the plurality of line clamps of the second bracket such that the second flexible line is fixed at the first and second brackets on opposite sides of the joint, wherein the line glands are configured to engage an outer surface of the second flexible line to hold the second flexible line from moving axially and to lock an axial position of the second flexible line relative to the first and second brackets on opposite sides of the joint,
wherein the first and second flexible lines are individually coupled and moveable independent of one another in free space relative to the first and second brackets and without interference from one another, such that movement of the collaborative robot results in negligible interaction forces from the plurality of flexible lines upon acting on one another.

16. A collaborative robot operating system comprising:
a collaborative robot comprising a first articulating arm and a second articulating arm connected by a joint and an end effector, the collaborative robot further comprising a first mount located at a first location and second mount located at a second location;
a plurality of flexible lines operable with the collaborative robot to facilitate a task associated with operation of the end effector of the collaborative robot; and
a collaborative robot line management system operable to manage the positioning and routing of the plurality of flexible lines relative to the collaborative robot, the collaborative robot line management system comprising:
a first bracket mounted to the first mount of the collaborative robot, the first bracket comprising a support portion having a plurality of apertures formed therein;
a second bracket mounted to the second mount of the collaborative robot, the second bracket comprising a support portion having a plurality of apertures formed therein;
one or more line clamps supported by the support portion of the first bracket, each of the line clamps being associated with a respective one of the plurality of apertures of the first bracket, each of the line clamps comprising a line gland having a thru hole aligned with the associated aperture;
wherein a first flexible line of the plurality of flexible lines is received through a first aperture of, and supported by, at least one of the first and second brackets, and clamped by at least one of the one or more line clamps of at least one of the first or second brackets, wherein the one or more line glands is configured to engage an outer surface of the first flexible line to hold the first flexible line from moving axially and to lock an axial position of the first flexible line relative to the first bracket,
wherein a second flexible line of the plurality of flexible lines is received through a second aperture of the first bracket and a second aperture of the second bracket, such that the second flexible line is supported by each of the first and second brackets, wherein the first and second flexible lines can be individually adjusted with respect to the first and second brackets and/or the collaborative robot independent of and without disrupting, removing or disconnecting the remaining flexible lines.

17. A collaborative robot operating system of claim 16, further comprising:
one or more line clamps supported by the support portion of the second bracket, each of the line clamps being associated with a respective one of the plurality of apertures of the second bracket, each of the line clamps comprising a line gland having a thru hole aligned with the associated aperture,
wherein the line glands supported by the support portions of the first and second brackets are configured to engage an outer surface of the first flexible line to hold the first flexible line from moving axially and to lock an axial position of the first flexible line relative to the first and second brackets on opposite sides of the joint.

\* \* \* \* \*

UNITED STATES PATENT AND TRADEMARK OFFICE
CERTIFICATE OF CORRECTION

| | |
|---|---|
| PATENT NO. | : 12,128,552 B2 |
| APPLICATION NO. | : 16/903291 |
| DATED | : October 29, 2024 |
| INVENTOR(S) | : Joseph E. Grella |

It is certified that error appears in the above-identified patent and that said Letters Patent is hereby corrected as shown below:

On the Title Page

Page 2, in Column 2, under "Other Publications", Line 4, delete "malled" and insert --mailed-- therefor In the Specification In Column 8, Line 47, delete "46." and insert --44.-- therefor In the Claims In Column 11, Line 50, in Claim 1, delete "thru" and insert --through-- therefor In Column 11, Line 55, in Claim 1, delete "thru" and insert --through-- therefor In Column 12, Line 17, in Claim 2, delete "thru" and insert --through-- therefor In Column 12, Line 64, in Claim 6, delete "thru" and insert --through-- therefor In Column 13, Line 1, in Claim 6, delete "thru" and insert --through-- therefor In Column 13, Line 38, in Claim 7, delete "thru" and insert --through-- therefor In Column 14, Line 13, in Claim 11, delete "thru" and insert --through-- therefor In Column 14, Line 17, in Claim 11, delete "thru" and insert --through-- therefor Signed and Sealed this
Thirteenth Day of January, 2026

John A. Squires
*Director of the United States Patent and Trademark Office*

CERTIFICATE OF CORRECTION (continued)
U.S. Pat. No. 12,128,552 B2

In Column 14, Line 54, in Claim 12, delete "thru" and insert --through-- therefor In Column 14, Line 58, in Claim 12, delete "thru" and insert --through-- therefor In Column 15, Line 47, in Claim 15, delete "thru" and insert --through-- therefor In Column 15, Line 53, in Claim 15, delete "thru" and insert --through-- therefor In Column 16, Line 51, in Claim 16, delete "thru" and insert --through-- therefor In Column 17, Line 12, in Claim 17, delete "thru" and insert --through-- therefor